Sept. 4, 1956 — J. SZUECS — 2,761,246
MUSHROOM CULTURE
Filed May 19, 1953

United States Patent Office 2,761,246
Patented Sept. 4, 1956

2,761,246

MUSHROOM CULTURE

Joseph Szuecs, Yonkers, N. Y.

Application May 19, 1953, Serial No. 355,949

16 Claims. (Cl. 47—1.1)

The present invention relates to the growth of edible mushroom mycelium of the family Helvellaceae in a simple, submerged, aerobic medium. According to the invention, a mushroom product is obtained, itself capable of synthesizing growth promoting substances such as vitamins.

In my prior U. S. patent application Serial No. 21,845 filed April 19, 1948, I described a method of providing an edible mushroom mycelium product under submerged aerobic conditions in a nutrient-containing, liquid substrate. The present invention relates to further improvements and discoveries pertaining generally to the same field as the aforesaid copending application.

There are more than two thousand species of edible mushrooms. Of these many species, only three can be grown with commercial success. (1) *Agaricus campestris*, ordinarily grown in stable manure, is the species employed in the inoculum of my copending application; it is susceptible to growth by aerobic submerged methods as there described. (2) The Chinese mushroom of the genus Volvaria, which may be grown on rice or paddy straw; and (3) the Japanese mushroom Shii-take, *Cortinellus berkelyanus*. The reason that these three species are the sole ones in cultivation devolves upon the fact that propitious circumstances must exist before other species of mushrooms can grow; these circumstances are found only in nature and ordinary methods of cultivation are futile.

One family of mushrooms especially desirable, inter alia, because of their taste and flavor are of the Helvellaceae, particularly the species *Morchella esculenta*. Clyde M. Christensen in "Common Edible Mushrooms," University Press of Minnesota, 1947, page 90 states in reference thereto: "In flavor and in texture, they surpass both the common cultivated species and most other wild mushrooms, and attempts have been made and still are being made to grow them commercially; so far without success . . ."

In accordance with the present invention, it has been found that mushroom mycelium of the family Helvellaceae, more particularly of the genus Morchella, otherwise known as morels, may be grown in a wide variety of nutrients in which *Agaricus campestris*, the species employed in the process of my copending application cannot grow. Molasses can be used as a nutrient in the present process; additionally the nutrient solutions employed can be of greater concentration. Even with such nutrient solutions, the morels provide faster utilization of carbohydrates giving much greater daily growth; possess greater tissue forming ability and are capable of employing inexpensive ammonium salts as the only source of nitrogen, none of these things are possible with *Agaricus campestris* employed as the inoculating material.

The object of the invention includes: the production of edible mushroom tissue of the family Helvellaceae, particularly of the genus Morchella, having a superior taste, flavor and texture; the provision of methods of growing mushroom tissue of the genus Morchella under submerged aerobic conditions in liquid substrates comprising a wide range of low cost nutrient material, particularly molasses, Jerusalem artichoke and wholly synthetic mediums; with a wide tolerance to solution concentration and solution contamination.

Referring now to the drawing.

Figure 1:
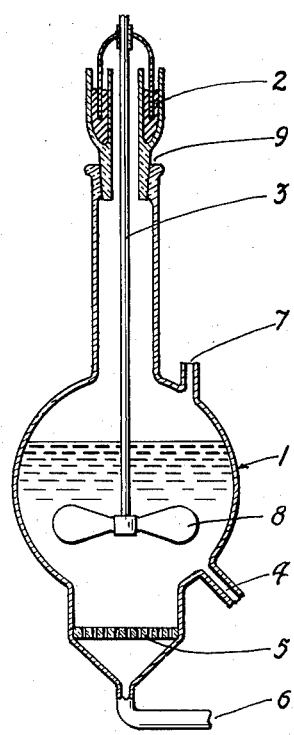
Fig. 1 is a diagrammatic sketch of the apparatus for carrying out the submerged aerobic growth according to the invention.

The apparatus shown in Fig. 1 is of a size and construction adaptable for the carrying out of the method according to the invention on a scale suitable for the quantity of solutions hereinafter given by way of example. It will be obvious to those skilled in the art that larger and more elaborate apparatus can and should be employed for commercial production in accordance with the invention.

Referring to Fig. 1, 1 is an especially constructed flask having a capacity of between 1½ to 3 gallons. At the top or neck of the flask, is a mercury seal 2 through which passes shaft 3 rotated by an electric motor or other suitable means. As the condition inside the flask 1 must be as sterile as possible, the mercurial seal 2 prevents the entrance of air into the flask 1 and the stopper 9, connecting the mercurial seal to the flask, can be a grounded joint, lubricated with silicon paste. Inlet 4 is provided for the introduction of the liquid nutrient and the inoculum. Flask 1 has a sintered glass bottom 5. Sterile air is led through the entrance 6, thence through the sintered glass bottom 5 and through the liquid substrate. Ground outlet 7 is provided for the escape of air after it has diffused through the liquid substrate. The shaft 3 is connected to a propeller 8 which in the present case has a diameter of 11.0 cm. and a blade width of 1.5 cm. for the 1½ gallon flask and includes 2 blades. For a 3 gallon flask the propeller 8 may have a diameter of 15.0 cm. and a width of 3.4 cm. The propeller dimensions bear upon the speed at which the shaft is to be rotated.

THE INOCULUM

The preparation of the inoculum according to the present invention provides a novel two stage operation, although conventional methods as described in my copending application can be employed at a loss of efficiency. The preparation of the inoculum may begin with pure cultures of a chosen mushroom species grown on potato-dextrose agar; the preparation of such cultures being known and understood by those skilled in the art. I have found the following species to be particularly desirable and adapted to the process hereinafter described. Of the genus Morchella: the species *esculenta; angusticeps* Pk; *bispora* Sor; *conica* Pers., *delicosa*-Fr., *hortensis* Boud.; *crassipes* (Vent) Pers.; H. *elastica* Bull; generally of the family Helvellaceae; *Helvella lacunosa*, Afz; *Gyrometra esculenta* (Pers.) Fr.; of the genus Verpa; *conica* (Muell) Swartz; *bohemica* (Kromb) Schroet. Of these species, *Morchella esculenta* has been found by me to be the most desirable for carrying out the invention.

In the first stage of the inoculum preparation, the pure cultures grown on potato-dextrose agar are used to inoculate 250 cc. Erlenmeyer flasks each containing 50 cc. of potato-dextrose solution, adjusted to a pH between 4.5 to 8.0. With lower pH, susceptibility for bacterial contamination reduces. It is important that effective distribution of the mycelium is here maintained, allowing the inoculum to grow from as many starting points as possible. A tissue grinder, such as the microhomogenizer described by Brendler in "Science," vol. 114, July 20, 1951 at pp. 61–62, is very suitable for effecting such distribution. The Erlenmeyer flasks are agitated on a rotary shaker at a speed of about 100 R. P. M. With lower agitation, the mycelium is inclined to clog or grow together forming few large aggregates; at higher speed, the mycellium may be harmed. After three days of agitation at room temperature, the culture is sufficiently advanced for transferrence to the succeeding stage of inoculum preparation.

In the second stage, a larger unit, such as a 3 liter container similar to the device shown in Fig. 1 having a sintered glass bottom for air distribution and a stirring device, is used. Proper agitation of the liquid is maintained at about 100 R. P. M. The growing solution can again be the same potato-dextrose solution adjusted to a pH of 4.5. A large number of growing solutions, however, are here suitable. They need only have the necessary mineral requirements for growing fungi; a carbohydrate source such as many of the common monosaccharides, or some of the disaccharides or their hydrolysates; and a nitrogen source such as ammonium salts or amino acids or any kind of protein hydrolysate.

The second stage is carried on for a period of about 3 days at which time the dextrose is consumed. The fungi grown will be very light in weight and distributed throughout the solution. Although the tendency is to form colonies, the structure of these colonies is loose and watery, having a solid content of 0.5 to 2.0%. The inoculum thus grown is removed from solution to a Buechner funnel for separation. The inoculum shrinks to a plate-like layer with a thickness of 1 to 2 mm.

The inoculum is now ready for addition to the nutrient solution and the final development stage giving the desired tissue formation.

THE FINAL NUTRIENT SOLUTION

In the tissue forming stage, certain requirements are to be met by the nutrient solution and apparatus employed. I have found that molasses and ammonium phosphate are adequate, efficient and cheap components which meet these requirements. Thus beet molasses, one of the cheapest and most readily obtainable of materials can be used as follows:

*Solution A*

|  | Grams |
| --- | --- |
| Beet molasses | 120 |
| $(NH_4)_2HPO_4$ | 6 |
| $CaCO_3$ | 4.8 |
| $K_2SO_4$ | 1.7 |
| $MgSO_4.7H_2O$ | 0.7 |
| Water to 2 l. | |

This solution is adjusted to a pH of 6.5 and is not filtered. The solution is then inoculated with 2 grams (calculated as dry weight) of submerged culture inoculum, prepared by the process heretofore described.

The nutrient and inoculum is then transferred to the apparatus previously described with respect to Fig. 1; agitation is begun at a speed of about 100 R. P. M. The speed specified is of course dependent upon the shape of the agitator employed; the speed given has been found suitable for the propeller 8, described. Air is introduced at a rate per minute equal approximately to the number of volumes of the solution in the flask.

After 72 hours of agitation and aeration in the manner described, assuming inoculum with *Morchella esculenta*, there will be harvested 36.7 g. (calculated as dry weight) of mycelium. The yield, on a basis of sugar to *Morchella esculenta* (calculated as dry weight) increase is 57.8%.

I have obtained successful results substituting $CaSO_4.2H_2O$ for the $CaCO_3$ specified in Solution A. In this event 5.1 g. of $CaSO_4$ is substituted therefor. As before, the solution is not filtered. When inoculated with 2 g. (calculated as dry weight) of *Morchella esculenta* submerged culture, there is a yield of approximately 31.2 g. (calculated as dry weight) of *Morchella esculenta*. On a sugar to *Morchella esculenta* (calculated as dry weight) increase basis, the yield is 48.66%.

After the completion of the 72 hour run specified both with regard to Solution A, the entire amount of $CaCO_3$ is digested; the nutrient solution maintains a constant pH through the 72 hour period of 6.5.

For the beet molasses suggested in Solution A, there may be substituted an equivalent amount of blackstrap molasses, high test or Cuban inverted molasses, citrus molasses, and wood molasses. The aforesaid wood molasses is cheaply produced by the hydrolysis of hard wood chips with dilute sulfuric acid filtered and is a by-product of the Wilson Dam project of the Tennessee Valley Authority. In all these types of molasses dilution may be made to a final sugar concentration of 5% with substantially unimpaired growth. Other members than *Morchella esculenta* of the Helvellaceae family grow quite well in nutrient solutions utilizing molasses, giving yields in sugar to (calculated as dry weight) mycelium increases of up to 60%. *Agaricus campestris* does not grow on molasses as described with the possible exception of high test molasses. Even on high test molasses, however, the growth of *Agaricus campestris* is slow and and retarded, the yield being less than 2% weight increase.

An important and inexpensive nutrient can be used in lieu of Solution A by making an extract in boiling water of the Jerusalem artichoke, *Helianthus tuberosus*. Such an extract would have all the needed requirements including the carbohydrate source, Inulin, in favorable relative amounts.

An important and necessary part for carrying out the process according to the present invention is the formation of colonies and mushroom tissue. These colonies and tissue form about small particles found in the nutrient material; I call these particles particulate support material. To illustrate the importance of this support material, if instead of the $CaCO_3$ or $CaSO_4$ suggested heretofore, a substitution is made of $CaCl_2.2H_2O$, 6.0 g. and the solution filtered, the nutrient material becomes a solution without the particulate support material contributed by the $CaCO_3$ or $CaSO_4$. With the same pH of 6.5 and an inoculation of 2 g. (calculated as dry weight) of *Morchella esculenta* submerged culture provides a harvest after 72 hours of 16 g. (calculated as dry weight) of mycelium. Thus, without the use of a particulate support material, the yield on the basis of sugar to (calculated as dry weight) *Morchella esculenta* increase is only 23.3%, substantially less than the results obtained with unfiltered Solution A containing $CaCO_3$ and $CaSO_4$ as described.

A new and unexpected result according to the invention is the ability of the family Helvellaceae, more particularly *Morchella esculenta* to synthesize "growth promoting" substances. It has always been considered that "growth promoting" substances are necessary for the proper cultivation of mushrooms. Cecil Treshchow (Dansk Botanish Arkiv, vol. XI, No. 6, 1944) has said that mushroom cultivation is impossible without "growth promoting" substances such as vitamins, etc. While, as set forth in my previously cited copending application, it is true that *Agaricus campestris* requires growth substances when used for submerged culture in a purely synthetic medium, I have discovered that mushrooms of the family Helvellaceae, particularly *Morchella esculenta*, can be employed in a submerged culture process according to the present invention and synthetize entirely the growth promoting substances which it requires.

Thus, an inoculum of submerged *Morchella esculenta* culture is prepared as previously described and is then added to the following nutrient solution:

Solution B

| | |
|---|---|
| Glucose | g 75 |
| 2(NH4)HPO4 | g 6.0 |
| MgSO4.7H2O | g 2.26 |
| K2SO4 | g 1.7 |
| MnSO4.4H2O | mg 50 |
| FeCl3 | mg 10 |
| CaCO3 | g 10 |
| Water to make 2 l. | |

The pH of this solution is adjusted to 6.5. One g. dry weight of submerged *Morchella esculenta* culture is added to Solution B and thence subjected to 72 hours aeration and agitation in the apparatus as previously described. There results a harvest of 44.3 g. mycelium (calculated as dry weight). The yield in sugar to (calculated as dry weight) *Morchella esculenta* mycelium increase is 59%.

Using synthetic medium without growth substance, Solution B with an inoculum of 1 g. submerged *Agaricus campestris* culture, the harvest after 72 hours of aeration and agitation will be 2.7 g. (calculated as dry weight). The yield in sugar to (calculated as dry weight) *Agaricus campestris* mycelium increase is 2.26% as compared to the 59.0% increase with *Morchella esculenta*. It is easily provable that this negligible harvest of *Agaricus campestris* is due to a lack of growth substance in the synthetic nutrient. Thus, if Solution B is provided with 5.0 g. of yeast extract (Difco) with the pH adjustment, aeration, agitation and inoculum *Agaricus campestris* as before, there is a harvest of 10.8 g. (calculated as dry weight) mycelium. The yield of sugar to (calculated as dry weight) *Agaricus campestris* increase is 13.0%. While this increase is a poor comparison to the yield obtained from *Morchella esculenta*, the larger yield of the latter is a natural result over *Agaricus campestris* used as the inoculating mycelium, and is independent of the absence or presence of growth substance.

The synthetizing ability of *Morchella esculenta* is easily measurable. Out of the purely synthetic Solution B, where the only organic component is glucose and the only nitrogen source is ammonium phosphate, tissue can be produced with 20% to 45% protein content, depending upon the concentration of ammonium phosphate utilized. An analysis of the vitamins in the tissue present shows the presence of the following:

| | Micrograms/grams dry weight |
|---|---|
| Thiamin | 3.92 |
| Riboflavin | 24.6 |
| Niacin | 82.0 |
| Pyridoxine | 5.8 |
| Pantothenic acid | 8.7 |
| Biotin | 0.75 |
| Folic acid | 3.48 |
| Vitamin B12 | 0.00362 |

Figure 2:
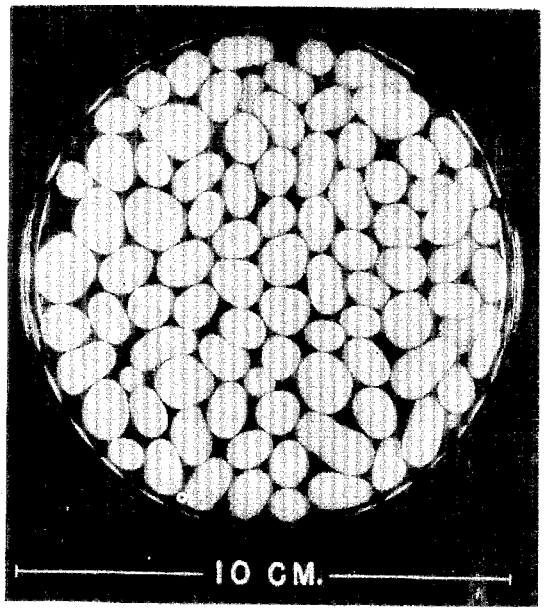
Fig. 2 is a photolithograph of the pellet-like Helvellaceae *Morchella esculenta* product produced in accordance with the teachings of the invention.

Fig. 2 is a reproduction of a typical end result of carrying out the teachings of the present invention. When properly carried out, the harvest will comprise ball-like pellets having a diameter comparable to that shown in the figure and possessing a firm, resilient tissue structure.

The examples heretofore given are included solely for the purposes of illustration. They are not regarded as necessary limitations of the invention but many modifications and variations will be apparent to those skilled in the art; these are included as part of the invention except as they do not come within the scope of the hereinafter appended claims.

What I claim is:

1. A process for the production of edible mushroom tissue of the family Helvellaceae comprising the steps of inoculating with an inoculum of mushroom of the family Helvellaceae, an aqueous solution containing nutrient material, applying gentle agitation to the said inoculum and solution sufficient to maintain the said inoculum in suspension, and simultaneously aerating the aqueous solution thereby cultivating tissue of the family Helvellaceae in pellet formation while submerged in the said solution.

2. A process for the production of edible mushroom tissue of the family Helvellaceae comprising the steps of inoculating with an inoculum of mushroom of the family Helvellaceae, an aqueous nutrient solution comprising molasses, applying gentle agitation to the said inoculum and solution sufficient to maintain the said inoculum in suspension, and simultaneously aerating the aqueous solution thereby cultivating tissue of the family Helvellaceae in pellets while submerged in the said solution.

3. A process of the production of mushroom tissue of the family Helvellaceae as set forth in claim 2 wherein the nutrient solution comprises beet molasses.

4. A process of the production of mushroom tissue of the family Helvellaceae as set forth in claim 2 wherein the nutrient solution comprises blackstrap molasses.

5. A process of the production of mushroom tissue of the family Helvellaceae as set forth in claim 2 wherein the nutrient solution comprises citrus molasses.

6. A process for the production of edible mushroom tissue of the family Helvellaceae comprising the steps of inoculating with an inoculum of mushroom of the family Helvellaceae, an aqueous nutrient solution consisting of the cooled extract in boiling water of the Jerusalem artichoke, *Helianthus tuberosus*, applying gentle agitation to the said inoculum sufficient to maintain the said inoculum in suspension, and simultaneously aerating the aqueous solution thereby cultivating tissue of the family Helvellaceae in firm pellet formation while submerged in the solution.

7. A process for the production of edible mushroom tissue of the family Helvellaceae comprising the steps of inoculating with an inoculum of mushroom of the family Helvellaceae, an aqueous nutrient solution comprising the cooled extracts in boiling water of the Jerusalem artichoke, *Helianthus tuberosus*, applying gentle agitation to the said inoculum sufficient to maintain the said inoculum in suspension, and simultaneously aerating the aqueous solution thereby cultivating tissue of the family Helvellaceae in pellet formation while submurged in the solution.

8. A process for the production of edible mushroom tissue of the family Helvellaceae comprising the steps of inoculating with an inoculum of mushroom of the family Helvellaceae, an aqueous nutrient solution comprising a medium of carbohydrate and a source of inorganic nitrogen in the absence of growth promoting substances, applying gentle agitation to the said inoculum sufficient to maintain the said inoculum in suspension, and simultaneously aerating the aqueous solution thereby cultivating tissue of the family Helvellaceae in pellet formation while submerged in the said solution.

9. A process for the production of mushroom tissue of the family Helvellaceae as described in claim 8 wherein the said carbohydrate and inorganic nitrogen source comprise glucose and ammonium phosphate, respectively.

10. A submerged process for the production of edible mushroom tissue of the family Helvellaceae comprising the steps of inoculating with an inoculum of mushroom of the family Helvellaceae, an aqueous nutrient solution, said nutrient solution comprising at least in part a particulate nutrient support material, applying gentle agitation to the said inoculum sufficient to maintain the said inoculum and support material in suspension, and simultaneously aerating the aqueous solution thereby cultivating tissue of the family Helvellaceae in pellets while submerged in the solution.

11. A process for the production of mushroom tissue of the family Helvellaceae as described in claim 10 wherein the said particulate nutrient support material comprises calcium carbonate.

12. A process for the production of mushroom tissue of the family Helvellaceae as described in claim 10 wherein the said particulate nutrient support material comprises calcium phosphate.

13. A submerged process for the production of edible mushroom tissue of the family Helvellaceae comprising the steps of inoculating with an inoculum of mushroom of the family Helvellaceae, an aqueous nutrient solution, said nutrient solution comprising at least in part a particulate nutrient support material, applying gentle agitation to the said inoculum sufficient to maintain the said inoculum and support material in suspension, simultaneously aerating the aqueous solution thereby cultivating tissue of the family Helvellaceae in pellets while submerged in the solution, and the pH of the said aqueous nutrient solution being maintained at a substantially constant value.

14. A submerged process for the production of edible mushroom tissue of the family Helvellaceae comprising the steps of preparing a culture of a species of mushroom of the family Helvellaceae, inoculating the said cultures in a first aqueous nutrient solution, agitating the solution to effect distribution of the culture in the first said medium for a period of about three days at room temperature, applying agitation and aeration to the culture in a second aqueous nutrient solution comprising a mineral source, a carbohydrate source and a nitrogen source for a period of about three days at room temperature thereby forming an inoculum material, inoculating with the said inoculum a third aqueous nutrient solution, said third nutrient solution comprising at least in part a particulate nutrient support material, applying gentle agitation to the said inoculum sufficient to maintain the said inoculum and support material in suspension and simultaneously aerating the aqueous solution thereby cultivating tissue of the family Helvellaceae in pellets while submerged in the solution.

15. A submerged process for the production of edible mushroom tissue of the genus Morchella comprising the steps of inoculating with an inoculum of mushroom of the family Helvellaceae, an aqueous nutrient solution, said nutrient solution comprising at least in part a particulate nutrient support material, applying gentle agitation to the said inoculum sufficient to maintain the said inoculum and support material in suspension and simultaneously aerating the aqueous solution thereby cultivating tissue of the genus Morchella in pellets while submerged in the solution.

16. A submerged process for the production of edible mushroom tissue of the family Helvellaceae comprising the steps of preparing a culture of a species of mushroom of the family Helvellaceae, inoculating the said culture in a first aqueous nutrient solution, agitating the said solution to effect distribution of the culture in the first said medium at room temperature, applying agitation and aeration to the culture in a second aqueous nutrient solution comprising a mineral source, a carbohydrate source and a nitrogen source at room temperature thereby forming an inoculum material, inoculating with said inoculum a third aqueous nutrient solution, said third nutrient solution comprising at least in part a particulate nutrient support material, applying gentle agitation to said inoculum sufficient to maintain said inoculum and support material in suspension and simultaneously aerating the aqueous solution thereby cultivating tissue of the family Helvellaceae in pellets while submerged in the solution.

References Cited in the file of this patent

UNITED STATES PATENTS

| | | |
|---|---|---|
| 2,005,365 | Di Giacinto | June 18, 1935 |
| 2,693,665 | Humfeld | Nov. 9, 1954 |

FOREIGN PATENTS

| | | |
|---|---|---|
| 315,215 | Great Britain | July 10, 1930 |

OTHER REFERENCES

Molliard and Fron: Comptes Rendus, vol. 140, pp. 1146–1148, 1187–1189 (1905).

Lambert: "Principles and Problems of Mushroom Culture," Botanical Review, vol. 4, pp. 397–426 (July 1938).